Patented Nov. 3, 1953

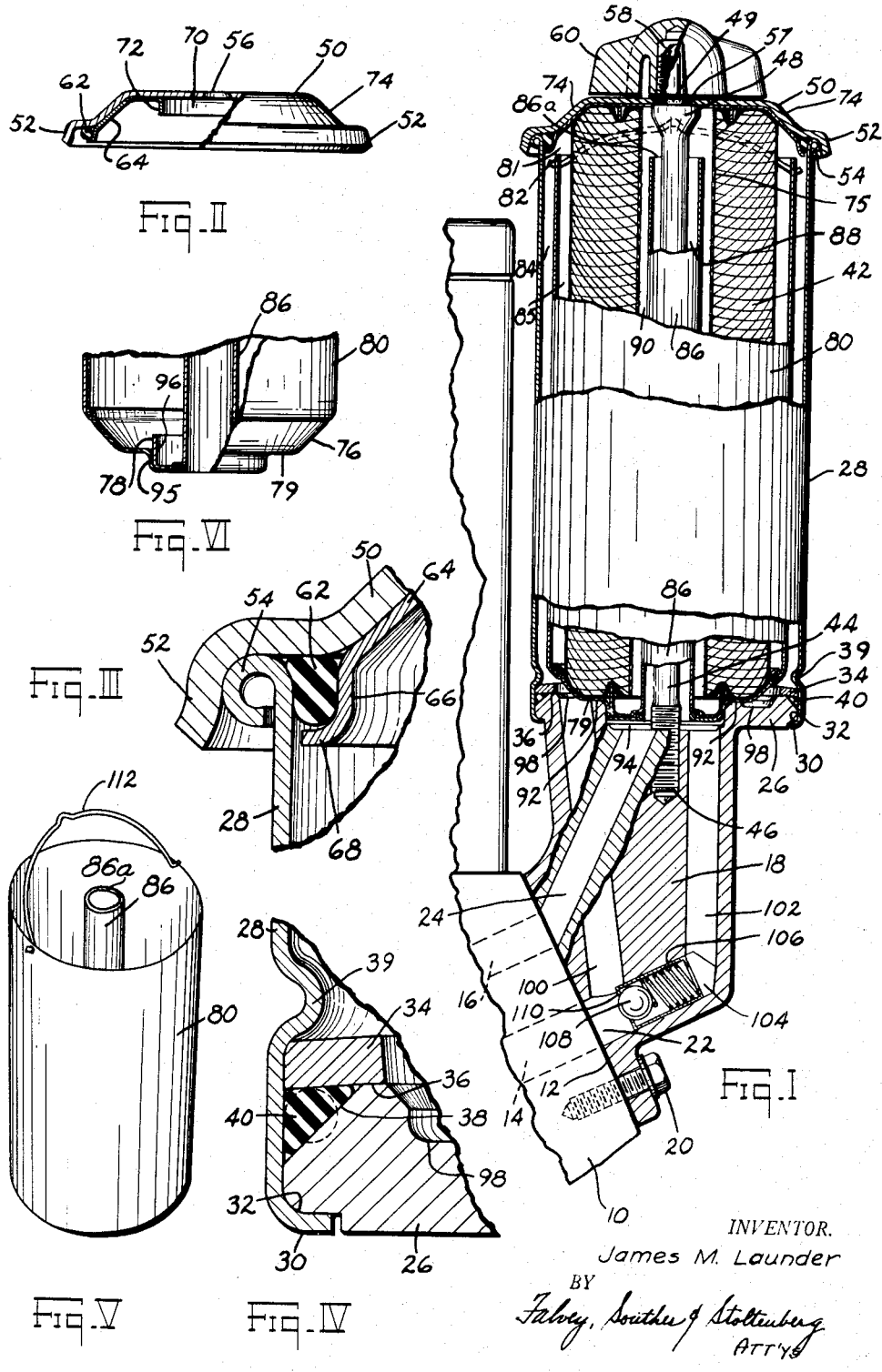

2,657,807

UNITED STATES PATENT OFFICE 2,657,807

OIL FILTER

James Mark Launder, Toledo, Ohio, assignor to The Electric Auto-Lite Company, Toledo, Ohio, a corporation of Ohio Application December 26, 1947, Serial No. 794,071

11 Claims. (Cl. 210—183)

The present invention pertains to a filter construction adapted for a great variety of uses but is particularly intended for service as an oil filter or purifier for removing foreign particles from engine lubricating systems.

The invention includes the provision of a composite filter housing for a replaceable filter cartridge which can be taken apart with ease to permit the quick replacement of the cartridge as well as the effective removal of all foreign matter and the disposal thereof, the filter housing being very simple and efficient from structural and functional standpoints.

The invention also includes means for interconnecting the separable parts of a filter housing, the interconnecting means having abutments in association with said separable parts whereby only a predetermined force can be applied thereto irrespective of the force exerted to tighten the said parts together.

The invention comprehends an oil filter highly adaptable for the lubricating systems of internal combustion engines, including means whereby the filter remains full of oil when the engine is not operating, avoiding the drain-back present in conventional filters and thereby eliminating any delay of oil flow upon starting which is usually caused in conventional filters by the presence of air within the filter.

The invention embraces an oil filter for engine lubricating systems including a secondary removable container for holding in position the replaceable filter cartridge. The container also performs the function of defining passageways for the flow of oil, so that drain-back does not occur, and which in addition is adapted to carry, when container is removed for changing cartridges, the exhausted cartridge and all foreign matter, thereby eliminating the possibility of contamination of the new, clean cartridge and the ingress of foreign matter to the engine bearings.

The invention contemplates the means and method of making a mechanically-tight joint between two metallic members, particularly between a sheet metal housing section of a filter and the supporting base casting by rolling or forming operations. The mechanically - tight joint is secured by the present invention by the use of a resilient or spring washer placed between the members and deformed during the rolling or forming operation.

The invention comprises a filter construction wherein a tubular housing of sheet material is secured to a base casting, providing a leak-proof joint capable of withstanding, without impairment, severe shocks and rapid vibration.

The invention is inclusive of a very efficient and simple means for carrying a deformable member for effecting an oil leak-proof seal between a detachable cover and casing and for also providing a liquid-tight joint between the ends of the filtering cartridge and the filter casing assembly by only clamping in closed position the removable cover to the filter casing.

An object of the invention is the provision of a deformable element for sealing a detachable cover to a filter casing by causing a substantial deformation of its normal cross-section and permitting the fluid pressure within the container to urge the deformed element into a tapered annular perimeter formed between the cover and casing, so that a maximum area of surface of contact of the sealing element with both sections of the filter casing is accomplished.

Another object of the invention is the production of a filter device which is assembled by simply inserting the filtering element within a secondary container having sections whereby the element is properly spaced with respect thereto and held in such position by the simple operation of turning a member associated with the cover for clamping the casing and cover together.

Another object attained by the invention is the provision of an oil filter for engines, wherein a removable secondary container is adapted to retain the contaminated filter cartridge and all the foreign matter for effective disposal, insuring the cleanliness of the stationary filter part, eliminating thereby the possibility of any foreign matter remaining in the filter casing to either have direct access to the engine bearings or decrease the capacity of the new filtering cartridge, as is usually the case with conventional filter constructions.

Another object of the invention resides in providing a unitary by-pass valve calibrated outside and independently of the filter, and adapted for quick insertion into a fluid passage of said filter.

Another object of the invention resides in an engine oil filter which, when the filtering cartridge becomes clogged, diverts the oil flow from the filter inlet passage directly into the outlet passage, so that efficient lubrication of the engine bearings is secured even though changing the filter element is neglected.

Another object of the invention is the provision of an improved hermetic seal between a detachable cover and a filter casing which does not require precision manufacture of parts due to the fact that the seal is accomplished by a substantial radial interference of the cover and housing with the sealing element requiring a comparatively low clamping force because of the substantial contacting area of the sealing element with the housing member and cover, permitting the use of a wing nut tightened manually.

Another object of the invention resides in a filter construction wherein a filtering element is held in proper spaced relation within a secondary open-ended container and concurrently an oil-leak-proof seal is obtained between a detachable cover and casing of said housing by the simple manual operation of turning a member carried by the cover to secure and seal the cover to the main casing.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is an elevational view in partial section showing the invention attached to the block of an automotive engine;

Fig. II is an elevation, partly in section, of the cover;

Fig. III is a sectional elevation of a detail;

Fig. IV is a sectional elevation of a housing detail;

Fig. V is a perspective view of one of the parts; and

Fig. VI is an elevational view, partly in section, of the inner member.

Referring to the drawings, particularly to Fig. I, an engine block 10 is shown in part, having an oblique face or pad 12, pierced by a pair of passageways, one forming a feeder 14 from the oil pump (not shown) and the other an outlet 16 in communication with the engine oil galleries (not shown) for conveying the oil to the parts of the engine to be lubricated. In the embodiment of the invention herein illustrated all of the oil pumped by the oil pump is shown as passing through the filtering means hereinafter to be described. However, it is to be understood that the filtering device of the invention, hereinafter to be described, is also applicable to by-pass filtering systems wherein only a portion of the oil from the pump is delivered to the filter.

Mounted against the pad 12 with suitable gaskets is a flanged casting or base member 18 of a filter housing fixed in mated relation thereto by bolts 20. The base member 18 is provided with an inlet passage 22 in communication with the feeder 14, and an outlet passage 24 in communication with the outlet passageway 16 provided in the engine block 10. The base member extends vertically and terminates at its upper end with a flat portion 26 having a circular perimeter extending into the bottom of a tubular housing section 28, which is permanently attached to the base member by rolling in the terminating edge 30 against a rounded perimetrical portion 32 as is best seen in Fig. IV. To provide a mechanically tight joint capable of withstanding engine vibrations of high amplitude and seal liquid tight the joint between the housing 28 and the base member 18, as well as to provide a resilient relation between the tubular housing and the base member to allow convenient rolling in of the lower terminating edge 30, a resilient ring or stress member 34 is positioned therebetween. The inner portion of member 34 contacts a planar section or plateau 36 formed inwardly of the perimetrical chamfer 38 which, in turn, extends downwardly therefrom. The stress ring 34 has its outer end cooperating with the housing 28 by contacting the lower sides of an inwardly formed annular bead 39, forming with both of said members an annular space having a triangular cross-section in which is fitted a deformable resilient sealing ring 40, generally called an "O-ring." With the terminating edge 30 of the housing 28 still in its vertical plane, the flat circular portion 26 of the base member 18 is fitted into the bottom of the housing 28 with the stress ring 34 in position and the sealing "O-ring" 40 in its triangular space. The portion 26 of the base member 18 is thrust upwardly (Figs. I and IV) until the perimeter of the stress ring 34 contacts the bead 39 and is deflected thereby with a predetermined load, the sealing ring 40 being deformed from a normal circular cross-section to a triangular one as shown. The terminating edge 30 is then cold rolled into final position and after release of the parts, the relaxation of the terminating edge will be compensated for by the deflection of the stress ring 34, so that a somewhat less than initial loading will always be active by the tension in the stress ring 34, whereby the rolled terminating edge 30 will be resiliently urged at all times against the rounded portion 32 of the base member 18. At the same time the sealing member 40 will be deformed by the stress member 34 to place an initial sealing pressure between the chamfer 38 and the inner side of the housing 28, aided by any fluid pressure to be found in the housing during its use.

The housing 28 extends upwardly in vertical position to a height depending on the length of a tubular filtering element 42 positioned therein, which will be described in further detail hereinafter. Positioned centrally of the housing 28, a longitudinally extending stud 44 is provided, threaded into a central aperture 46 of the base member 18 so as to allow limited adjustment of an upset collar portion 48 adjacent the upper end of the housing. A detachable cover 50 is provided for closing the housing section 28 having a dished conformation to give added stiffness and terminating into a peripheral flange 52 to fit on the exterior of a marginal bead 54 of the housing 28. The cover 50 is provided with a central aperture 56 to fit a threaded extension 58 of the stud 44 above the enlarged collar portion 48, against which the cover 50 is urged in a manner to give a close cooperative fit between the flange 52 and the bead 54 of the housing. A wing nut 60 is threaded into the extension 58 to cooperate with the upper side of the cover and hold it against the bead 54 and urge the same to be stopped by its engagement with the collar 48.

To provide a seal between the housing 28 and the cover 50 to retain oil pressure contained in the enclosure 28, an annular deformable ring 62 is provided of relatively soft, resilient material, positioned between the parts at the bead 54 and held in the converging space therebetween by a flanged keeper 64, preferably spot-welded concentrically to the interior of the cover 50. Normally the annular ring 62 is circular in cross section as shown in Fig. II, but when placed in cooperative position with the cover 50, it is deformed, as shown in Fig. III, to force the ring, usually called an "O-ring," into the converging space between the bead 54 and the cover 50 as shown. To accomplish this purpose the flange of the keeper 64 has a depending portion 66 in substantially parallel relation with the inner side of the housing 28 and an outwardly-extending terminating portion 68 substantially normal thereto as shown in Fig. III. This construction provides a roughly rectangular space extending annularly inside of the bead 54 of the housing 28 in which the "O-ring" 62 is positioned. The initial deformation of the ring 62 provides a seal for relatively low pressures, the sealing properties being enhanced by the action of pressure on the ring as the oil pressure increases in the housing.

The keeper 64 is provided with a central aperture 70 concentric with the aperture 56 of the cover 50 and is provided with a depending flange 72 to cooperate with the filtering element 42 to provide a seal at its upper end as will be described hereinafter.

As has already been described, the tubular filtering element 42 is positioned in the housing 28 and determines the longitudinal dimension thereof, so that the cover 50 cooperates with the element and compresses it to a degree to obtain a good seal at the ends thereof. The cover 50, being dished, has a cone section 74 which cooperates with the cylindrical conformation of the filtering element, by distorting the square ends thereof to aid in centering the element in the housing about the stud 44 and also to give a partial seal, which is further enhanced by the depending flange 72 of the keeper 64. The flange 72 is embedded into the deformable material of which the filtering element is formed outside of the foraminous tube or screening 75 on which fuzzy cotton yarn is wound in criss-cross fashion to form apertures filmed by the fuzz of the yarn to give the filtering action. In a similar manner, the lower end of the filtering element is centered and sealed by a second cone section 76 and an upstanding flange 78, both of which are formed in the bottom 79 of a secondary container 80, as distinguished from the housing 28, which may be called the primary container. The secondary container 80 extends upwardly from its bottom to substantially the bead 54 of the housing 28, with the allowance of a clearance 81 between its terminating edge or lip 82 and the cover 50. The container 80 is of a diameter substantially smaller than the housing 28 to provide thereby an annular space 84 therebetween and is of a diameter somewhat larger than the diameter of the filtering element 42 to provide an annular clearance 85 therebetween. The secondary container is also provided with an upstanding central tube 86 sealed in the bottom, inside of the flange 78 extending upwardly approximately the same distance as the side wall. The diameter of the tube 86 is such that it provides an annular clearance 88 between itself and the stud 44 that extends concentrically through the tube, and provides a second annular clearance 90 preferably of the same cross sectional area as the clearance 88 between itself and the screen tube 75 on which the filtering element is wound.

The bottom 79 of the secondary container 80 contacts, under pressure, an annular surface or plateau 92 formed on the base member 18, being thrust thereagainst by the filtering element 42 which is compressed into the interior of the container by the tightening of the cover 50 by the turning of the nut 60 threaded to the stud 44. A depression 94 is formed within the plateau 92 which accommodates the reduced end portion or extending boss 95 of the secondary container 80. The vertical wall of the projecting boss 95 forms a convenient vertical surface 96 to which the flange 78 (already described) is conveniently attached on the interior of the container 80. The tube 86 is suitably attached concentric of the projecting boss 95, and is thereby also concentric with the annular flange 78. The base member 18 is provided with an annular depression 98 between the plateaus 36 and 92 which is in communication with the inlet 22 by means of passageway 100, preferably bored in the base member from the top. The outlet passageway 24 is also bored from the top and communicates with the central depression 94, which is also in communication with the inlet 22 by a pair of intersecting bores 102 and 104 as shown in Fig. I. The bore 102 is drilled from the top, while bore 104 is drilled through the inlet 22 and has press-fitted into it a tube 106 housing a by-pass valve which consists of a ball 108 spring biased against a valve seat 110, so positioned that oil pressure in the inlet 22 will retract the ball 108 from its seat 110 against the spring bias when a predetermined oil pressure is exceeded to allow the oil to by-pass the filter element via bores 104 and 102 into depression 94, thence through passageway 24 to the outlet 16.

In order to avoid the possibility of the fluid within the container leaking past the aperture 56 of the cover 50, which accommodates the threaded end of the stem 44, the aperture 56 is chamfered and a deformable gasket 57, preferably of the "O-ring" type, is placed in the recess 49 of the threaded stem 44. The gasket 57 is deformed by its engagement with the chamfer and, in turn, urged by the fluid pressure to intimately contact the chamfered section and the threaded recess, thereby providing a liquid-tight sealed joint between cover, threaded member, and manually operable nut 60.

When the filtering device already described is in use on an automotive engine, the oil circulating pump of the engine forces the oil from the engine sump to the feeder passageway 14 of the engine block 10, where it flows into the inlet 22 of the base member 18, thence through passageway 100 to the annular depression 98 and the annular space 84 between the primary and secondary containers, thence through the clearance 81 and over the lip 82 of the secondary container 80 into the annular space 85 between the inside of the secondary container and the outside of the filtering element 42. The seals formed at the ends of the filtering element by the flanges 72 and 78 contain the oil on the exterior of the filtering element and builds up the desired pressure to force the oil through the filtering element to pass thereafter through the screen tube 75 into the annular space 90 between the screen tube and the outside of the central tube 86 on the secondary container. The oil will collect in this space in the secondary container until its level reaches the upper end surface or lip 86a of the tube 86, over which it will fall into the annular space 88 between the central stud 44 and the inside of the tube 86 and into the depression 94 at the bottom thereof. Thence the oil will flow through the outlet passageway 24 to the outlet 16 in the engine block 10 to the oil galleries for lubricating the bearings and the like. The seals at the ends of the filtering element will contain the oil in the interior of the filtering element in the spaces 88 and 90 to allow without hindering the building up of the desired pressure for the proper lubrication of the bearings.

In addition, the "O-rings" 40 and 62 will contain the oil pressure in the primary container or housing 28 to prevent leakage and loss of oil from the system.

When the engine is not operating, drain-back of the oil by gravity from the filtering element 42 is prevented by the secondary container 80 which holds the oil about the filtering element by maintaining the level up to the lips 82 and 86a, so that the filtering element is always contained in oil and no air can enter the pores of the element. Should the filtering element become clogged or pressure build up in the container 28 including the inlet 22, passageway 100 and the annular spaces 84 and 85 to exceed a predetermined value, it will be relieved by the check valve 108 which will by-pass the oil in parallel with the filtering element to allow the oil to flow past it to the outlet 16 as already described.

When it is desirable to change the filtering element, the cover 50 is removed by first disengaging the nut 60, then the secondary container 80 is removed as a unit by a bail 112 conveniently provided for this purpose to remove the filtering element and the contaminants which are collected on the exterior of the filtering element in the secondary container 80, and permitting the ready and effective disposal of the dirty elements. A new, clean filtering element in a cleaned or new secondary container is then inserted in the housing and the cover 50 replaced to place the device again in operative condition.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In an oil filter, the combination of an enclosing casing having a removable cover, a secondary annular container having a closed end, an annular filtering element of compressible filtering material open at both ends and arranged in spaced relation in said secondary container forming therein an outer liquid space between said filtering element and outer wall of the secondary container and an inner liquid space within the filtering element and inner wall of the secondary container, means for urging said cover to closed position on said casing, said cover and a closed end of said secondary container having portions which press on the opposite ends of said compressible filtering element and act when the cover is held in closed position on the casing to compress and form therewith tight joints at the ends of the filtering element causing the closed end of the secondary container to contact under pressure the lower inner surface of the enclosing casing, conduits terminating at the interior of the enclosing casing, for admitting liquid to one of said liquid spaces and discharging it from the other liquid space formed on the base of said casing, and passageways for the flow of oil from the end of said conduits to said liquid spaces defined by the container walls rendered effective by the engagement of the secondary container with said casing and being so arranged that drain-back of oil from said liquid spaces does not occur.

2. In a filter, a closed casing having a relative stationary housing coacting with a detachable cover to permit access to the interior of the casing, a secondary annular container having a closed end, a tubular filter screen disposed endwise in said secondary container, the cover and the end of said secondary container bearing against the ends of the filter screen to clamp the same under pressure to cause the engagement of the closed end of said secondary container and the stationary housing and close communication between the inside and outside of the tubular filter screen at its ends, removal of the detachable section permitting removal of the secondary container from the casing for the disposal of the filter screen and all contaminants, conically-formed sections on said detachable cover whereby said filter screen is spaced largely along its lateral peripheral surface from the outside wall said secondary container to provide an outer chamber, and the stationary housing constituting the lowermost portion of said filter casing and provided with fluid passages leading to the interior of the housing, and connections for the separate flow of fluid to said chamber and to the interior of said tubular screen rendered effective by the engagement of the closed end of the secondary container with the stationary housing so that drain-back of fluid from the secondary container does not occur.

3. In a liquid filter, a closed casing having a removable section to permit access to the interior thereof, a secondary container, a filtering screen confined within the removable section of said casing and said secondary container, means for clamping the sections of said casing in closed position, closing the passage of fluid at the ends of said screen and causing engagement under pressure of the container with the inner surface of the base section of the casing, a primary liquid passage leading to the one side of said filtering screen and another primary liquid passage leading to the other side of said screen both passages provided on the base section of said casing the engagement of the secondary container with the base section intercepting direct flow communication within the casing, whereby a liquid may be forced through said screen; a by-pass liquid passage between said primary passages, and a precalibrated pressure responsive device comprising a tube housing a spring-biased ball and a valve seat therefor forming a quickly insertable self-contained assembly in said by-pass liquid passage, said device normally blocking said by-pass passage and operable for directly interconnecting said primary passages when the resistance to the passage of the liquid through the filtering screen increases above a predetermied amount to permit the fluid to pass around said screen.

4. In a liquid filter, a closed casing having a removable cover to permit access to the interior thereof, a secondary open-ended container spaced from the walls of the casing, a tubular filtering medium located within said secondary container, means for clamping the removable cover in closed position in said casing and compressing the filtering medium at its ends closing the passage of fluid at said ends said casing having a primary liquid passage leading to the interior of said filtering medium and another primary liquid passage leading to the annular space of said casing surrounding said secondary container, whereby a liquid may be forced through said filtering medium, a by-pass passage in said casing for interconnecting said primary passages, and a precalibrated pressure responsive device including a member constituting the valve seat and the housing for a spring-biased valve thereby forming a quickly insertable self-contained assembly in said by-pass passage, said device operable for interconnecting said primary passages when the resistance to the passage of the liquid through the filtering medium increases above a predetermined amount.

5. A liquid filter casing comprising a metallic rigid base member, a tubular sheet metal member, a detachable cover for closing said tubular member, the rigid member having a flanged portion adapted to project within and be embraced by said tubular member terminating into an annular seat spaced from its outer periphery, the tubular member formed with an inwardly projecting section adjacent to the annular seat of the flanged section of said rigid member, a perimetrical chamfer extending downwardly from said annular seat formed on the flanged section of the rigid member, metallic spring washer contacting at its outer periphery with the inwardly projecting section of the tubular member and at its inner periphery with the annular seat of the flanged section of the rigid member thereby forming a closed triangular annular chamber between the tubular member and the rigid member, a deformable sealing element located in said triangular annular chamber for sealing the rigid member and tubular members, the end of the tubular member embracing the bottom surface of the flanged section of the base member whereby the metallic spring washer is stressed and maintains thereby the tubular member and rigid member in contacting relation and the cross section of the deformable member is modified for intimate contact with the said perimetrical chamfer and inner surface of the tubular member.

6. In a filter, a closed casing having a relative stationary housing coacting with a detachable cover to permit access to the interior thereof, a centrally located depression provided at the closed end of said stationary housing, an annular shaped secondary container having a closed lower end, a tubular filter screen disposed endwise in said secondary container, the lower end of said secondary container and cover respectively bearing against the ends of the filter screen to clamp the same under pressure to thrust the closed end of the secondary container into engagement with said depression and close communication at its ends between the inside and outside of the tubular filter screen, removal of the detachable section permitting removal of the secondary container for the concurrent disposal of the filter screen and all contaminants, a conically shaped section formed on said detachable cover whereby said filter screen is spaced largely along its lateral peripheral surface from the outer wall of said secondary container to provide a chamber, and the stationary housing constituting the lowermost portion of said filter casing and provided with fluid passages for establishing fluid connections to said chamber and to the interior of said tubular screen said connections being rendered effective by the engagement of the secondary container into the depression of said housing whereby drain-back of the fluid from the filter screen does not occur.

7. In a liquid filter, a closed casing provided with a stationary section coacting with a detachable cover to permit access to the interior thereof, a depression formed on the inner surface of the closed end of said stationary casing a secondary container having a closed end in said casing, a depending section formed on the closed end of said secondary container fitting said depression, a tubular filter screen disposed endwise in said secondary container, the end of said cover and the closed end of the secondary container bearing against the ends of the filter screen to clamp the screen under pressure, thrusting the depending section of the secondary container into said depression, means formed on said cover and on the closed end of said secondary container whereby said filter screen is spaced largely along its lateral peripheral surface from the outside wall of the secondary container to provide a chamber and close communication between the inside and outside of the tubular filter screen at its ends, the stationary section of said casing constituting the lower portion of said filter casing and being provided with fluid passages leading to the interior of said casing, and the thrusting engagement of the depending portion of the container with the depression of said casing establishing separate passageways for the fluid to said chamber and to the interior of said tubular filter screen the arrangement being such that drain-back of fluid does not occur and the removal of the secondary container carries with it the filter screen and all foreign matter separated thereby permitting the effective disposal thereof when filter screen is changed.

8. In a filter for filtering a liquid under pressure having an open ended casing part for housing a removable filter cartridge, the casing being provided with inlet and outlet ports and terminating at its open end into a sealing marginal rim, the combination with said casing of a removable closure for closing the open end of the casing part, a sealing surface formed on the under side of said closure part adjacent to its periphery having direct abutting engagement with said marginal rim to form the sealing juncture of said parts, a depending surface formed on said closure extending from said sealing surface dimensioned to telescope the exterior of said marginal rim, a seal keeper fixedly secured to the under side of said closure part having inner and outer depending flanges, the inner flange of said keeper having engagement with one end of the filter cartridge to provide a liquid seal therewith, the outer flange of said keeper being so constructed and arranged to form with said closure and casing parts a substantially rectangularly shaped open space extending annularly within the casing and being located in close proximity to the sealing juncture of the casing and closure parts, a deformable ring-like seal of circular cross section loosely fitting said substantially rectangularly shaped space, said deformable seal dimensioned to be exposed to the pressure of the liquid and deformed by the simultaneous contact with the inner faces of the casing and closure parts adjacent their sealing juncture so that the ring-like member is in tight sealing engagement therewith by the pressure of the liquid providing a seal the effectiveness of which increases as the pressure in the filter increases, and means associated with the casing and closure parts for clamping them in position causing simultaneously the direct abutting engagement to said planar surface with said marginal rim and of the inner flange of said seal keeper with the filter cartridge.

9. In a filter for filtering a liquid under pressure having an open ended container part for housing a removable filter cartridge, the container part being provided with inlet and outlet ports and terminating at its open end into a sealing marginal bead, the combination with said container part of a removable closure part for closing the open end of said container part, an annular sealing surface formed on the under side of said closure part for direct abutting engagement with said marginal bead forming the sealing juncture of said parts, a depending flange secured to the under side of said closure part for engagement with the filter cartridge providing a liquid seal therewith, a seal keeper of sheet metal secured to the under side of said closure part, said seal keeper formed with a depending portion extending in spaced relation from the inner face of the wall of said container part and terminating into an outwardly extending substantially transverse portion, the said keeper and a portion of said annular sealing surface forming an open ended seal retaining space of channel shaped configuration positioned to bridge the sealing juncture of said container and closure parts, a deformable seal loosely retained in said channel shaped space, said deformable seal being dimensioned to project from said space to be exposed to the liquid under pressure and provide radial interference for simultaneous contact with the inner faces of the casing wall and closure part adjacent to their juncture so that the seal is deformed into sealing engagement therewith when the annular seat and marginal sealing bead are in abutting relation and into tighter sealing engagement therewith as the pressure of the liquid in the filter increases, and means associated with the casing and closure parts for clamping them in position causing the abutting engagement of said annular seat with said bead.

10. In a filter for filtering a liquid under pressure, a composite closed casing for retaining a removable filter element provided with inlet and outlet ports comprising an open ended tubular sheet metal housing section and a detachable cover section of sheet metal, a curved marginal sealing surface formed at the open end of said housing section, the periphery of said cover section formed to telescopically engage the exterior of said curved marginal sealing surface, a planar sealing surface formed on the under side of the closure section, means associated with said sections for clamping the same in position to form the composite closed casing causing direct abutting engagement of said sealing surfaces and forming a converging space adjacent to the sealing juncture of said sections of sheet metal, a seal keeper fixedly secured to one of said sections formed with a portion in substantially parallel relation with the inner wall of the tubular housing section, said seal keeper with its parallel portion being so constructed and arranged with respect to the housing and closure sections to form therewith an open annular seal carrying space of substantially rectangularly shape located adjacent to the sealing juncture of said sections, a ring-like deformable sealing member carried in said open rectangularly shaped space, said sealing member being dimensioned to have side clearance in said space and direct engagement with the inner faces of the abutting mating surfaces adjacent said converging space, and said sealing member being deformed by its engagement with the inner faces of said sealing surfaces and forced by the pressure of the liquid in the casing into said converging space forming a leak-proof seal for said sections the effectiveness of the seal provided by the sealing member increasing as the pressure of the liquid in the filter is increased.

11. In a filter for filtering a liquid under pressure, a leak-proof composite casing formed of separable sections one constituting an open ended container part and another a closure part therefor, the closure part formed with an aperture, a filtering medium confined within said composite casing, inter-engaging tensioning members causing direct abutting engagement of the end surfaces of the container and closure parts forming the sealing juncture of the composite casing, said inter-engaging members having a portion located within and fixedly carried by the container part co-acting with another portion located externally of the closure part for clamping them in closed position, one of said inter-engaging members provided with a shank passing through the aperture of said closure part, a deformable ring-like sealing member located in a recess formed on the shank of said sealing member being disposed and arranged so as to be deformed by its engagement with the walls of said aperture and by the pressure of the liquid in the composite casing to form a leak-proof seal between said shank and the closure aperture, and a second deformable member carried by the closure part adapted to be positioned within the container adjacent to the sealing juncture of the direct abutting end surfaces of closure and container parts so as to be distorted by its simultaneous engagement with the inner faces of said abutting end surfaces and by the fluid pressure within the casing to form a leak-proof seal between the end surfaces of the container and closure, and the effectiveness of the sealing action of both deformable sealing members increasing as the pressure in the casing increases.

JAMES MARK LAUNDER.

References Cited in the file of this patent

UNITED STATES PATENTS

| Number | Name | Date |
|---|---|---|
| 588,800 | Livingston | Aug. 24, 1897 |
| 1,448,344 | Hauf | Mar. 13, 1923 |
| 1,654,615 | Smith | Jan. 3, 1928 |
| 1,664,985 | Mauser | Apr. 3, 1928 |
| 1,748,852 | Smith | Feb. 25, 1930 |
| 1,758,412 | Sheppy | May 13, 1930 |
| 1,969,524 | Rollason | Aug. 7, 1934 |
| 2,226,045 | Baldwin | Dec. 24, 1940 |
| 2,239,868 | Williams | Apr. 29, 1941 |
| 2,278,881 | Jacocks | Apr. 7, 1942 |
| 2,342,948 | Long | Feb. 29, 1944 |
| 2,390,539 | Katcher | Dec. 11, 1945 |
| 2,404,410 | Smith | July 23, 1946 |
| 2,478,639 | Reed | Aug. 9, 1949 |